(12) United States Patent
Van Natter et al.

(10) Patent No.: US 7,945,603 B2
(45) Date of Patent: May 17, 2011

(54) SYSTEM AND METHOD FOR EFFICIENTLY STORING INFORMATION RELATED TO A TELEPHONE NUMBER

(75) Inventors: Douglas Van Natter, Birmingham, AL (US); John D. Ensminger, Birmingham, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 12/632,125

(22) Filed: Dec. 7, 2009

(65) Prior Publication Data

US 2010/0088319 A1  Apr. 8, 2010

Related U.S. Application Data

(63) Continuation of application No. 10/243,667, filed on Sep. 16, 2002, now Pat. No. 7,630,983.

(51) Int. Cl.
*G06F 17/30* (2006.01)

(52) U.S. Cl. .......................................... 707/830; 707/753
(58) Field of Classification Search .................. 707/705, 707/711, 713, 715, 740–747, 752, 753, 754, 707/821, 830, 999.007, 999.1, 800, 812, 707/E17.083
See application file for complete search history.

(56) References Cited

U.S. PATENT DOCUMENTS

| | | | |
|---|---|---|---|
| 5,745,892 A * | 4/1998 | Miyata et al. ........................... 1/1 |
| 6,349,299 B1 * | 2/2002 | Spencer et al. ................ 707/702 |
| 7,007,149 B2 * | 2/2006 | Chung ........................... 711/170 |
| 7,630,983 B1 * | 12/2009 | Van Natter et al. .................... 1/1 |
| 2002/0059234 A1 * | 5/2002 | Gumpertz et al. ................ 707/7 |

* cited by examiner

*Primary Examiner* — Greta L Robinson
(74) *Attorney, Agent, or Firm* — Hope Baldauff Hartman, LLC

(57) ABSTRACT

Information related to telephone numbers is efficiently stored and retrieved by generating an index based on a portion of a telephone number for which information is to be stored or retrieved. For example, the portion of the telephone number can be a prefix of the telephone number. Information related to the telephone number is stored and retrieved in accordance with the generated index.

17 Claims, 4 Drawing Sheets

```
# NUMBERING PLAN

NPRANGE = 10000      // NUMBER OF PHONE NUMBERS IN EACH PREFIX
NPDIGITS = 6         // LENGTH OF THE NUMBERS IN THE LIST BELOW

NPPREFIXES = {
        918230              // TULSA
        918231
        918232
        918260
        918261
        918284
        918519
        918520
        918521
        918527

210624              // DALLAS
        213200
        214502
        214577
        214674
        214695
        214697
        214728
        214794
        218292
        226664
        303446
        303825
        323791
        405317
        806570
        806622
        806654
        806674
        806681
            }
```

*Fig. 2*   — PARAMETER FILES

SORTED_LIST [0] = 210624
SORTED_LIST [1] = 213200
SORTED_LIST [2] = 214502
SORTED_LIST [3] = 214577
SORTED_LIST [4] = 214674
SORTED_LIST [5] = 214695
SORTED_LIST [6] = 214697
SORTED_LIST [7] = 214728
SORTED_LIST [8] = 214794
SORTED_LIST [9] = 218292
SORTED_LIST [10] = 226664
SORTED_LIST [11] = 303446
SORTED_LIST [12] = 303825
SORTED_LIST [13] = 323791
SORTED_LIST [14] = 405317
SORTED_LIST [15] = 806570
SORTED_LIST [16] = 806622
SORTED_LIST [17] = 806654
SORTED_LIST [18] = 806674
SORTED_LIST [19] = 806681
SORTED_LIST [20] = 918230
SORTED_LIST [21] = 918231
SORTED_LIST [22] = 918232
SORTED_LIST [23] = 918260
SORTED_LIST [24] = 918261
SORTED_LIST [25] = 918284
SORTED_LIST [26] = 918519
SORTED_LIST [27] = 918520
SORTED_LIST [28] = 918521
SORTED_LIST [29] = 918527

} SORT LIST

*Fig. 3*

SYSTEM AND METHOD FOR EFFICIENTLY STORING INFORMATION RELATED TO A TELEPHONE NUMBER

CROSS-REFERENCE TO RELATED APPLICATIONS

This application is a continuation of U.S. patent application Ser. No. 10/243,667, filed on Sep. 16, 2002, now U.S. Pat. No. 7,630,983 issued on Dec. 8, 2009, and entitled "System and Method for Efficiently Storing Information Related to a Telephone Number," which is expressly incorporated herein by reference in its entirety.

BACKGROUND

1. Field of the Invention

The present invention relates generally to the field of archiving information related to telephone numbers. More specifically, the present invention relates to determining an index based on a telephone number with which to store information related to that telephone number.

2. Background of the Invention

Archiving or storing information related to telephone numbers is required for telephone companies to manage their businesses. Whether stored in hardcopy or electronic form, the information must be readily accessible to a telephone company so that it can properly bill customers, keep track of and respond to subscriber problems and complaints, maintain statistics related to quality of service and obtain or determine other information about the services it provides to its subscribers.

Due to the vast number of telephone numbers that exist, storage of this information in hardcopy form quickly becomes unwieldy in terms of both storage and retrieval. Large storerooms are required to store the huge volumes of paper that contain the information. These storerooms are expensive to maintain and difficult to manage efficiently and even more difficult to use for information retrieval.

As a result, the information is usually stored in electronic form. The information itself can include any information related to a telephone number. For example, the information can be stored in a telephone account for a particular telephone number. Such telephone account information generally includes a telephone account number, the telephone number, the name and address of the subscriber, service information such as the services to which the subscriber subscribes, billing information and service call history for the subscriber.

The information can also be information that is stored for use in analyzing telephone calls. For example, information commonly found in a call detail record (CDR) can be used for this purpose. This information includes the calling and called party telephone numbers, the time of the call, information related to the switch handling the call, the duration of the call and other information related to the call. As described in co-pending U.S. application Ser. No. 10/094,640, "System and Method For Managing CDR Information," to R. Cerami et al., file Mar. 12, 2002 (the "'640 application") which h is incorporated by reference herein in its entirety, the CDRs can be analyzed to provide numerous statistics related to the services provided by the telephone company.

In some cases, the information relates to a condition or status of the telephone number. For example, the information can be in the form of one or more flags corresponding to a particular service or feature that is provided by the telephone company, or to a condition of a telephone. These flags can be stored as bits in bytes or words stored in computer memory. A flag is set if the subscriber subscribes to the service corresponding to the flag or the telephone condition exists, and is not set if the subscriber does not subscribe to the telephone service corresponding to the flag or the telephone condition does not exist.

Regardless of the kind of information associated with a telephone number that is stored, it is desirable to be able to efficiently access that information. Conventionally, information related to a telephone number is stored for reference by an account number. Retrieval of the information is relatively straightforward. For example, a database lookup based on account number can be used to retrieve or store the information.

However, if all that is known is the telephone number, storage and retrieval of information related to the telephone company is more difficult. This is because conventional access mechanisms generally use the entire telephone number as an index to obtain information related to the telephone number. One problem with storing information about telephone numbers using the entire telephone number as an index is the large number of storage elements that are required. For example, with 10-digit telephone numbers as are used in the United States, ten billion ($10^{10}$) storage elements are required to be able to store information for each possible telephone number. Currently, this amount of storage is not readily available in RAM. While the storage could be provided using one or more disks, this would be a slow process due to the numerous disk accesses required to access the information related to the telephone numbers. The problem is magnified in contexts where the information relating to the telephone numbers is accessed more often, for example, in the analysis contexts of the '640 application described above.

SUMMARY OF THE INVENTION

The present invention solves the forgoing problems by preprocessing telephone numbers to generate an index according to which the information relating to the telephone numbers is stored. Preferably, the preprocessing is performed using a list of portions of telephone numbers that are expected in the particular market in which the present invention is implemented. The list is consulted and the index is generated using the portions of telephone numbers in the list to reduce the storage requirements that would otherwise be necessary. For example, an index is generated from the 10-digit numbers used in the United States to an index comprising fewer than 10 digits. In this manner, the storage requirements for storing the information can be greatly reduced. As a result the information relating to the telephone numbers can be accessed more efficiently.

In one embodiment, the present invention is a method for efficiently storing and retrieving information related to a telephone number. The method begins with the step of generating an index using a portion of the telephone number. Then information related to the telephone number is stored and retrieved in accordance with the generated index.

In another embodiment, the present invention is a method for efficiently storing information related to a telephone number. The method begins with the step of storing a list of telephone number prefixes. The list of stored telephone number prefixes is sorted. A prefix is obtained from the telephone number for which related information is to be stored. A determination is then made as to whether the obtained prefix matches one of the prefixes in the list. If there is a match, an index corresponding to the telephone number for which information is to be stored is generated, and the information is stored in accordance with the generated index. If there is no match, an indication that the telephone number is invalid is returned.

In another embodiment, the present invention is a method for efficiently retrieving information related to a telephone number. The method begins with the step of storing a list of telephone number prefixes. Next, the list of stored telephone number prefixes is sorted. A prefix is obtained from the telephone number for which related information is to be retrieved. A determination is then made as to whether the obtained prefix matches one of the prefixes in the list. If there is a match, an index corresponding to the telephone number for which information is to be retrieved is generated, and the information is stored in accordance with the generated index. If there is no match, an indication that the telephone number is invalid is returned.

In another embodiment, the present invention is a system for efficiently storing and retrieving information related to a telephone number. The system includes a computer having a disk. A parameter file is stored on the disk. The parameter file includes a list of telephone number prefixes. The telephone number prefixes in the list are stored into a random access memory (RAM) on the computer. The computer includes means for causing the computer to generate an index derived using a portion of the telephone number as well as means to cause the computer to store and retrieve information related to the telephone number in accordance with the generated index.

BRIEF DESCRIPTION OF THE DRAWINGS

FIG. 2 is an exemplary parameter file containing telephone number prefixes corresponding to telephone numbers for which information relating to the telephone number is to be stored or retrieved.

FIG. 3 is a sorted list of the telephone prefixes contained in the exemplary parameter file of FIG. 2.

DETAILED DESCRIPTION OF THE INVENTION

Figure 1:
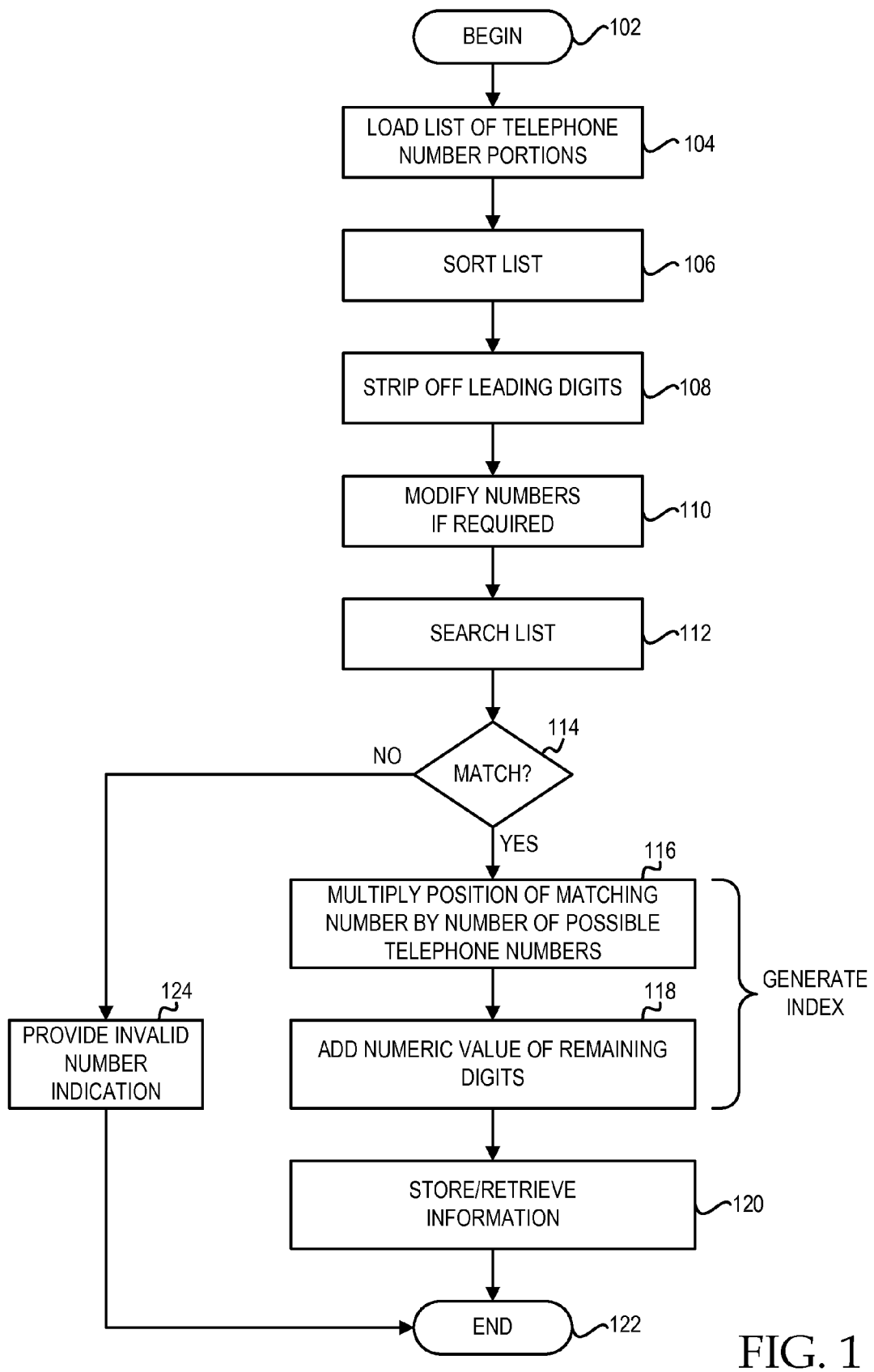
FIG. 1 is a method for efficiently storing or retrieving information related to a telephone number according to an embodiment of the present invention.

FIG. 1 is a flow chart for a method for efficiently storing and retrieving information related to telephone numbers according to an embodiment of the present invention. The method can be performed by any computer system, including its associated hardware, capable of carrying out its steps as described in more detail below.

The method begins in step 102 whereupon execution immediately continues in step 104 with the step of loading a list of telephone number prefixes. The telephone number prefix is a portion of a telephone number that corresponds to more than one telephone number. For example, the prefix can be the well-known NPA-NXX used in the United States. As is well-known, each NPA-NXX corresponds to 10,000 telephone numbers. While the present invention is described in terms of using a prefix of the telephone number, it would be apparent to those skilled in the art that any portion of the telephone number (less than the entire telephone number) can be used. In addition, the telephone number can be modified, such as by using a hashing algorithm to reduce the number of digits in the telephone number. The portion of the telephone number or hashed telephone number is used in a manner similar to the way the prefix is used as described below.

Preferably, the telephone number prefixes are loaded from a parameter file and stored into a random access memory of a computer. An exemplary parameter file comprising a list of telephone number is illustrated in FIG. 2. The parameter information can also store information about the prefixes. For example, the exemplary parameter file illustrated in FIG. 2 includes an NPRange and an NPDigits variable. The NPRange variable contains the number of telephone numbers that can correspond to a prefix. In the case of conventional NPA-NXX, NPRange is set to 10000. The NPDigits variable stores a value indicating the number of digits in each prefix. In the case of conventional NPA-NXX, NPDigits is set to 6. In an alternate embodiment of the present invention, there can be more than one NPRange variable and more than one NPDigits variable.

The method continues in step 106 with the step of sorting the list of telephone number prefixes. For example, the telephone number prefixes can be sorted in ascending order. FIG. 3 illustrates the prefixes of the exemplary parameters file sorted in ascending order and stored in an array SORTED_LIST. Steps 104 and 106 can be performed as an initialization step prior to operating the system to store or retrieve information related to telephone numbers.

When information relating to a telephone number is to be stored or retrieved, the method continues in step 108 with the step of stripping off leading digits from the telephone number for which information is to be stored or retrieved. For example, any leading 1's, 0's or country codes are removed. Such stripped off digits are not considered part of a telephone number for purposes of the present invention. In step 110, the telephone number is modified if required. One use of modification is to removed redundancy. For example, in Peru, the following telephone numbers correspond to the same telephone number 021xxxxxxx, 521xxxxxxx and 716xxxxxxx. Consequently, in step 110, a 521 or 716 telephone number is converted to an 021 telephone number by changing the 521 or 716 to 021 and appending the remainder of the number.

In step 112, the method continues with the step of searching through the sorted list of prefixes, using the prefix of the stripped, modified telephone number as a search key to determine if one of the prefixes matches the prefix of the stripped modified telephone number.

If there is a match (determined in step 114), the method generates an index for the telephone number. The index corresponds to a location where information related to the telephone number is to be stored or retrieved. The index is generated in steps 116 and 118. In step 116, the position of the matching prefix in the sorted list is multiplied by the number of telephone numbers that can be represented by the particular prefix. For example, in the United States, using conventional NPA-NXX as the prefix, the position of the matching prefix in the list is multiplied by 10000. In step 118, the remaining digits of the telephone number for which information is to be stored or retrieved are added to the product obtained in step 116. The remaining digits are the digits remaining after removing the prefix of the telephone number. For example, in the United States, using a conventional telephone number having the form NPA-NXX-nnnn, the remaining digits are nnnn. In step 120, the information related to the telephone number is stored or retrieved using the index generated in step 120. The method then ends in step 122.

If there is no match in step 114, then an indication that the telephone number: is an invalid telephone number is returned in step 124. For example, a "−1" can be returned to indicate that the telephone number is invalid. If a "−1" is received by the calling routine, notice can be provided to a user of the system that the telephone number is invalid. The method then ends in step 122.

Several exemplary indexes are generated to help explain the present invention. Suppose the telephone number for which information is to generated or stored is 210-624-0005. Referring to FIG. 3, the position of the prefix in the sorted list corresponding to this telephone number is 0. The numerical value of the digits of the telephone number remaining after the prefix is removed is 5. The number of telephone numbers corresponding to each prefix (NPRange) is 10000. Thus, referring to steps 116 and 118 in the method described in FIG. 1, the index for the telephone number is 0*10000+5=5. Therefore, the information is stored at or retrieved from a memory location associated with the index 5.

In another example, suppose the telephone number for which information is to generated or stored is 214-577-1234. Referring to FIG. 3, the position of the prefix in the sorted list corresponding to this telephone number is 3. The numerical value of the digits of the telephone number remaining after the prefix is removed is 1234. The number of telephone numbers corresponding to each prefix (NPRange) is 10000. Thus, referring to steps 116 and 118 in the method described in FIG. 1, the index for the telephone number is 3*10000+1234=31234. Therefore, the information is stored at or retrieved from a memory location associated with the index 31234.

In another example, suppose the telephone number for which information is to generated or stored is 213-823-1000. Referring to FIG. 3, there is no prefix in the sorted list corresponding to the telephone number. Consequently, there is no match in step 114. As a result, an indication that the telephone number is invalid is returned in step 124.

Figure 4:
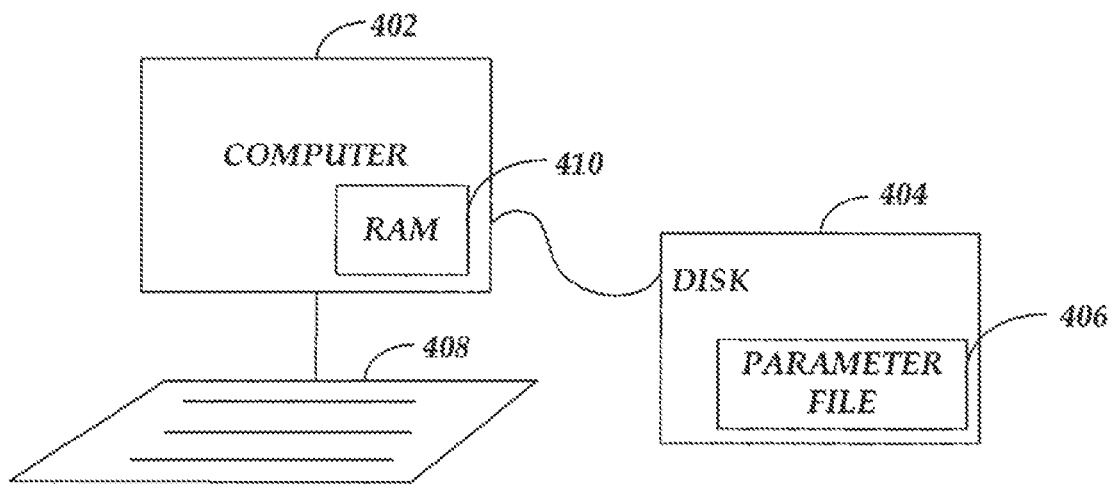
FIG. 4 is a schematic illustration of a system for efficiently storing or retrieving information related to a telephone number according to an embodiment of the present invention.

FIG. 4 is a schematic illustration of a system for efficiently storing and retrieving information related to a telephone number according to an embodiment of the present invention. A computer 402 is operatively coupled to a disk 404. Computer 402 includes a random access memory 410. A parameter file 406 is stored on disk 404. An exemplary parameter file is illustrated in FIG. 2. A keyboard 408 is coupled to computer 402. Computer 402 is any computer that can be programmed to execute the method described above with respect to FIG. 1. Such computers are well known in the art and need not be described further. Computer 402 can be located in a switch, in a central office and coupled to a switch, or located remotely and coupled to a switch by a computer network.

In operation, parameter file 406 is stored in RAM 410. As described above, parameter file 406 includes a list of telephone number prefixes (or other portions or derivations of telephone numbers) according to which an index for storing or retrieving information related to a telephone number is generated. Preferably, parameter file 406 is stored in RAM 410 and sorted prior to storing or retrieving information related to telephone numbers. Computer 402 includes means for causing the computer to execute the method described above for storing and retrieving information related to telephone numbers. For example, computer 402 can be programmed to execute the method.

In an alternate embodiment of the present invention, a user can enter the list of telephone number prefixes (or other portions of telephone numbers) using keyboard 408. Keyboard entry can provide a backup means of storing the telephone prefix (or other portions of telephone numbers) in RAM 410.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computer-implemented method for efficiently storing and retrieving information related to a telephone number, comprising computer-implemented operations for:

receiving a first telephone number;

generating a first telephone number portion by stripping a digit from the first telephone number;

generating a numerical value corresponding to the first telephone number portion;

retrieving a sorted list of telephone number portions, each of the telephone number portions corresponding to a position value defining a numerical position in the sorted list;

retrieving a range value defining number of telephone numbers associated with each of the telephone number portions in the sorted list;

determining whether the first telephone number portion is found in the sorted list of telephone number portions;

in response to determining that the first telephone number portion is found in the list of telephone number portions, computing an index value based on the position value, the range value, and the numerical value, wherein computing an index value based on the position value, the range value, and the numerical value comprises:

computing a product of the position value and the range value, and computing the index value by adding the product and the numerical value; and storing the first telephone number in a memory location associated with the index value.

2. The computer-implemented method of claim 1, further comprising computer-implemented operations for:

prior to determining whether the first telephone number portion is found in the sorted list of telephone number portions, stripping leading ones, leading zeroes, and country codes from the first telephone number.

3. The computer-implemented method of claim 1, further comprising computer-implemented operations for:

prior to determining whether the first telephone number portion is found in the sorted list of telephone number portions, removing redundancy from the first telephone number.

4. The computer-implemented method of claim 1, wherein the first telephone number portion comprises a six-digit prefix of the first telephone number.

5. The computer-implemented method of claim 1, wherein the numerical value comprises a four digit suffix of the first telephone number.

6. The computer-implemented method of claim 1, further comprising computer-implemented operations for:
in response to determining that the first telephone number portion is not found in the list of telephone number portions, returning an indication that the first telephone number is invalid.

7. A system for efficiently storing and retrieving information related to a telephone number, comprising:
a memory for storing a program containing code for efficiently storing and retrieving information related to the telephone number; and
a processor functionally coupled to the memory, the processor being responsive to computer-executable instructions contained in the program and configured to
receive a first telephone number,
generate a first telephone number portion by stripping a digit from the first telephone number,
generate a numerical value corresponding to the first telephone number portion,
retrieve a sorted list of telephone number portions, each of the telephone number portions corresponding to a position value defining a numerical position in the sorted list,
retrieve a range value defining number of telephone numbers associated with each of the telephone number portions in the sorted list,
determine whether the first telephone number portion is found in the sorted list of telephone number portions,
in response to determining that the first telephone number portion is found in the list of telephone number portions, compute an index value based on the position value, the range value, and the numerical value, wherein to compute an index value based on the position value, the range value, and the numerical value, the processor is configured to:
compute a product of the position value and the range value, and
compute the index value by adding the product and the numerical value, and
store the first telephone number in a memory location associated with the index value.

8. The system of claim 7, wherein the processor is further configured to:
prior to determining whether the first telephone number portion is found in the sorted list of telephone number portions, strip leading ones, leading zeroes, and country codes from the first telephone number.

9. The system of claim 7, wherein the processor is further configured to:
prior to determining whether the first telephone number portion is found in the sorted list of telephone number portions, remove redundancy from the first telephone number.

10. The system of claim 7, wherein the first telephone number portion comprises a six-digit prefix of the first telephone number.

11. The system of claim 7, wherein the numerical value comprises a four digit suffix of the first telephone number.

12. A computer-readable medium having instructions stored thereon for execution by a processor to provide a method for efficiently storing and retrieving information related to a telephone number, the method comprising:
receiving a first telephone number;
generating a first telephone number portion by stripping a digit from the first telephone number;
generating a numerical value corresponding to the first telephone number portion;
retrieving a sorted list of telephone number portions, each of the telephone number portions corresponding to a position value defining a numerical position in the sorted list;
retrieving a range value defining number of telephone numbers associated with each of the telephone number portions in the sorted list;
determining whether the first telephone number portion is found in the sorted list of telephone number portions;
in response to determining that the first telephone number portion is found in the list of telephone number portions, computing an index value based on the position value, the range value, and the numerical value, wherein computing an index value based on the position value, the range value, and the numerical value comprises:
computing a product of the position value and the range value, and
computing the index value by adding the product and the numerical value; and
storing the first telephone number in a memory location associated with the index value.

13. The computer-readable medium of claim 12, the method further comprising:
prior to determining whether the first telephone number portion is found in the sorted list of telephone number portions, stripping leading ones, leading zeroes, and country codes from the first telephone number.

14. The computer-readable medium of claim 12, the method further comprising:
prior to determining whether the first telephone number portion is found in the sorted list of telephone number portions, removing redundancy from the first telephone number.

15. The computer-readable medium of claim 12, wherein the first telephone number portion comprises a six-digit prefix of the first telephone number.

16. The computer-readable medium of claim 12, wherein the numerical value comprises a four digit suffix of the first telephone number.

17. The computer-readable medium of claim 12, further comprising computer-implemented operations for:
in response to determining that the first telephone number portion is not found in the list of telephone number portions, returning an indication that the first telephone number is invalid.

* * * * *